United States Patent Office 2,989,545
Patented June 20, 1961

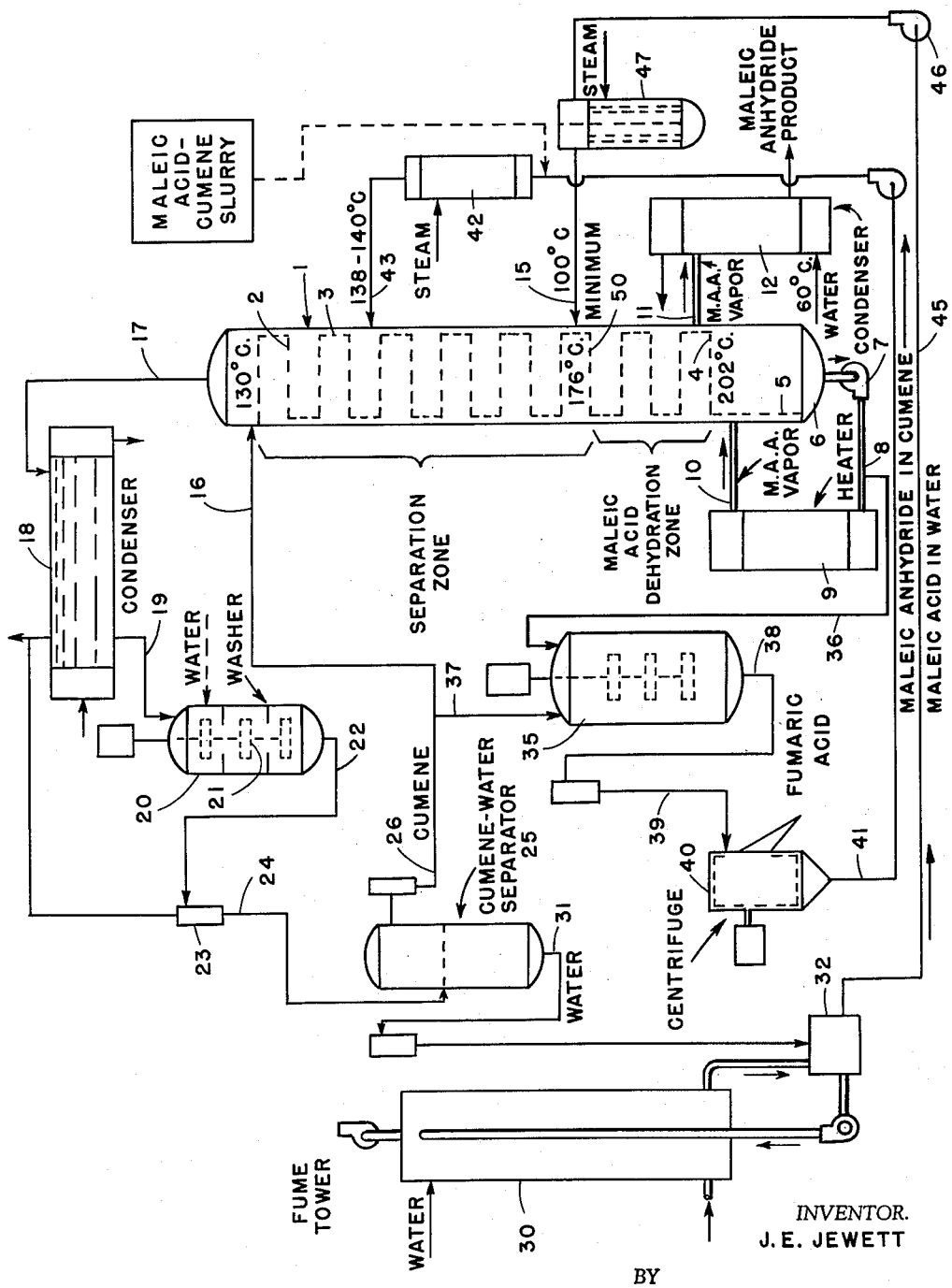

---

2,989,545
PRODUCTION OF MALEIC ANHYDRIDE
Joseph E. Jewett, Larchmont, N.Y., assignor to American Cyanamid Company, New York, N.Y., a corporation of Maine
Filed July 29, 1957, Ser. No. 674,846
7 Claims. (Cl. 260—346.8)

This invention relates to a method and apparatus for producing maleic anhydride by the dehydration of maleic acid. The invention is particularly applicable to aqueous maleic acid solutions obtained by scrubbing the gases from catalytic vapor phase oxidation processes with water or aqueous scrubbing liquid, such as the off gases from the oxidation of naphthalene to phthalic anhydride and the maleic anhydride-containing gases from the oxidation of benzene, toluene, phenols and the like. The process of the invention can also be applied to solutions or suspensions of maleic acid in organic solvents such as xylenes, mesitylene, cumene and the like.

The effective dehydration of maleic acid to maleic anhydride is a problem of long standing that has presented many difficulties. Principal among these is the avoidance of excessive losses by decarboxylation of the maleic acid to acrylic acid and other decarboxylation products and the formation of acrylic-maleic acid copolymers. Some losses also occur by isomerization of maleic acid to fumaric acid. It is a principal object of the present invention to provide a process wherein losses through decarboxylation and polymerization are minimized by a rapid dehydration of maleic acid in the presence of maleic anhydride vapor. A further object is the provision of an effective means for recovering the maleic anhydride vapor and returning it to the dehydration zone. A still further object is the provision of such methods that can be carried out on a commercial scale in ordinary fractionating equipment. Other objects of the invention will be apparent from the following description of a preferred embodiment thereof when taken with the appended claims.

The dehydration process of my invention is carried out by feeding maleic acid into a dehydration zone containing a body of refluxing maleic anhydride that is continuously heated to relatively high temperatures by contact with a rising stream of maleic anhydride vapor so that the acid is rapidly decomposed into a mixture of maleic anhydride vapor and superheated steam. The resulting mixture is then passed upwardly into a superimposed separation zone where the maleic anhydride vapor is condensed by contact with a water-immiscible maleic anhydride solvent. This solvent has a boiling point lower than that of maleic anhydride but higher than that of water and therefore it is vaporized and separated from the maleic anhydride by fractional distillation in the presence of the superheated steam. The solvent-free condensed maleic anhydride is returned by gravity to the dehydration zone while the solvent vapors are recovered by condensation and returned to the separation zone as reflux.

Losses of maleic anhydride values in this process are greatly reduced by the relatively high dehydration temperatures and correspondingly short dehydration times employed in the dehydration zone. The temperature at the bottom of this zone is that of the maleic anhydride vapor which supplies the heat necessary for the dehydration and solvent fractionation processes; this temperature is between about 190° C. and 220° C. under 500 to 850 mm. of mercury pressure which represents a suitable operating pressure range. The maximum temperature at the top of the dehydration zone is the boiling temperature of the liquid phase at the operating pressure used; this phase contains only maleic anhydride, maleic acid dissolved in its anhydride, liquid phase maleic acid and possible traces of water. It is substantially free from organic solvent and therefore boils at about 165°–190° C. at the operating pressures indicated above, the boiling point of the mixture being lowered by the presence of superheated water vapor in the vapor phase.

Important operating advantages can be obtained by a proper selection of the water-immiscible organic solvent used in the maleic anhydride recovery step. The use of a solvent boiling above the melting point of maleic acid, about 130° C., will prevent the deposition of solid maleic acid in the fractionating column. A solvent boiling above 142° C. will cause acrylic acid to be vaporized from the system. The solvent should of course not form a constant boiling mixture with maleic anhydride. The alkylbenzene hydrocarbons boiling in the range of about 135°–175° C. at atmospheric pressure are suitable solvents having some or all of these properties, ortho-xylene, mesitylene and cumene being a preferred class boiling at or above 142° C. The solvent is introduced into the top of the separation zone and passed downwardly in this zone in countercurrent contact with the rising superheated steam and maleic anhydride vapor and functions to prevent any substantial loss of this vapor while permitting the steam to escape from the top of the column.

Fumaric acid is always formed to some extent whenever maleic acid is heated, but it is not formed from maleic anhydride. The rapid dehydration obtained in my process reduces the extent of fumaric acid formation, but does not completely eliminate it. In accordance with another feature of the invention I provide for a preferably continuous removal of fumaric acid by drawing off a portion of the maleic anhydride used as the heating agent, dissolving it in a solvent and centrifuging the resulting solution to separate out the solid fumaric acid that is insoluble therein. The volatile solvent used to recover and return the vaporized maleic anhydride from the dehydration zone is preferably employed for this purpose since it can be processed for recovery of maleic anhydride values by feeding the solution to the separation zone at the appropriate level.

The invention will be further described and illustrated with reference to the accompanying drawing wherein the single figure is a flow sheet in which an embodiment thereof is diagrammatically illustrated. It will be understood that although certain temperatures and a particular solvent are shown on this drawing for purposes of illustration, the invention in its broader aspects is not limited thereto.

Referring to the drawing the fractionating column designated generally by reference numeral 1 is of standard construction and contains a number of superimposed plates 2 containing bubble caps or other comparable elements for promoting vapor and liquid contact. These plates are connected by downcomer pipes 3, which conduct the overflow liquid from one plate to the plate immediately below. The bottom plate of the column, indicated by reference numeral 4, is connected by a downcomer pipe 5 to the column base 6 which functions as a collector for liquid maleic anhydride. This liquid is preferably continuously withdrawn through a pump 7 and pipe 8 into a heater 9 where it is vaporized, the maleic anhydride vapors being returned to the column through pipe 10. A side outlet pipe 11 is provided above the bottom plate 4 for withdrawing product maleic anhydride vapor, which is condensed in a condenser 12 by heat exchange with a suitable coolant.

The column 1 is provided with an inlet line 15 at an intermediate level therein for the introduction of a liquid feed containing maleic acid. The plates below the level of this inlet line 15 function as the maleic acid dehydration zone while those above the inlet line constitute the separation zone in which maleic anhydride and the organic solvent are separated by fractional distillation. The solvent is introduced at the top of the column through reflux line 16 while a mixture of steam and solvent vapor is withdrawn through line 17 and passed into a total condenser 18. The condensate passes through line 19 into a tank 20 provided with an agitator 21 and then flows by way of outlet line 22, hydrostatic level tank 23 and line 24 into a separating tank 25. In this tank the condensate separates by gravity into a lower aqueous layer and an upper layer of the organic solvent, the latter being withdrawn through line 26 and returned in part to reflux line 16 for reintroduction into the column 1.

A fume tower for absorbing in water the gaseous maleic anhydride from a benzene oxidation unit is indicated by reference numeral 30. The structure and operation of this tower is described in U.S. Patent No. 2,098,047. Water withdrawn from the lower layer in the separation tank 25 through line 31 is passed into the catch basin 32 of the fume tower in order to recover any maleic acid that may have been lost as maleic anhydride through the top of the fractionating column.

In order to separate fumaric acid formed in the column 1, a maleic anhydride dissolving tank 35 is provided. This tank is connected with the pipe 8, leading from the bottom of the column, by a branch line 36 through which a continuous bleed of maleic anhydride with fumaric acid in solution and in suspension is withdrawn. The tank 35 is also connected with the organic solvent recovery line 26 by means of a branch line 37. A solution of the maleic anhydride in the organic solvent is therefore prepared in tank 35 and is passed through outlet lines 38 and 39 to a centrifuge 40 or other solids separating means for removing the undissolved fumaric acid. The purified solution from the centrifuge is passed through line 41 and through a heater 42 and introduced through line 43 on an appropriate plate of the column 1.

Aqueous maleic acid solution is preferably continuously withdrawn from the recirculating tank 32 at the base of the fume tower and used as feed for the process. Although the drawing shows the passage of solution from this tank directly into the tower through line 45, pump 46 and preheater 47, it will be understood that the feed solution may be preconcentrated to a higher maleic acid content if desired. This can readily be accomplished by passing it through a flash evaporator, where sufficient water may be volatilized to increase the maleic acid concentration to 50–80%; the resulting hot concentrated solution can then be passed directly into the tower without the necessity of additional preheating. Alternatively, the fume tower 30 may be operated with a recirculating stream of cumene or other organic maleic anhydride solvent, instead of water. In this case a slurry of maleic acid crystals in cumene would be obtained, due to the hydrating action of the steam present in the off gases from the benzene oxidation unit, and this slurry would be fed into the dehydration process by the procedure described in Example 2.

In carrying out the process of the invention in the above-described equipment, the feed solution of aqueous maleic acid or maleic acid-organic liquid slurry is introduced onto a feed plate 50 in the column 1 and passes downwardly over the plates below which constitute, in effect, a dehydration zone wherein the maleic acid is converted into maleic anhydride and any additional water present is converted into steam. A quantity of maleic anhydride corresponding to the maleic acid feed is continuously withdrawn through line 11 and condensed in the condenser 12, and is obtained as the maleic anhydride product. Simultaneously, maleic anhydride in the base 6 of the column is continuously vaporized in the heater 9 and introduced through pipe 10 below the bottom plate 4 of the dehydration zone, from which level it rises through the bubble caps on the plates constituting this zone and accomplishes the dehydration of the maleic acid and the vaporization of water as described. The maleic anhydride vapor continues to rise through the plates of the column above the feed plate and in the separation zone it meets a stream of cumene or other suitable solvent and is condensed thereby. Cumene has a boiling point lower than that of maleic anhydride, but higher than that of water under the pressure conditions used in the column, and the mixture can therefore be separated by fractional distillation into an overhead fraction of cumene containing little or no maleic anhydride and a bottom fraction of maleic anhydride substantially free from cumene. This is accomplished by providing a sufficient quantity of maleic anhydride vapor from the heater 9 both to dehydrate the maleic acid feed and vaporize its water content and also to vaporize the feed of condensing liquid introduced through the line 16.

The dehydration and fractionation process of the invention may be operated under any desired pressure, either subatmospheric or superatmospheric, but for most purposes ordinary atmospheric pressures are satisfactory. It will be understood that, at any operating pressure, the steam formed in the dehydration zone functions as superheated water vapor in the separation zone to lower the operating temperature therein by an amount determined by its partial pressure, just as would be the case with any other inert gas such as nitrogen, air or carbon dioxide; it therefore does not form an azeotrope with the organic solvent. The solvent is not permitted to reach the feed plate 50, which is the highest plate in the column on which water can exist in the liquid phase, and therefore the highest point at which a water-solvent azeotrope can form. Below the feed plate there exists only maleic anhydride, maleic acid in solution in anhydride, liquid phase maleic acid, and possible traces of water if evaporation of free water on the feed plate is not rapid enough. There is no organic solvent on or below the feed plate, and therefore there is again no azeotropic dehydration. Operation at a temperature level such that the temperature at all points in the column where maleic acid can exist as a separate phase, either due to dehydration (above the feed plate) or to carrying down with reflux (below the feed plate), is above the melting point of maleic acid precludes any accumulation of solid phase maleic acid and its isomerization in solid phase to fumaric acid.

The process of the invention will be further described and illustrated by the following specific examples. It will be understood, however, that although these examples may describe certain preferred features of the invention, they are given primarily for illustrative purposes and that modifications and substitutions of equivalents may be resorted to within the scope of the appended claims.

*Example 1*

This example illustrates the production of maleic anhydride from an aqueous maleic acid solution of the type produced in the absorber 30 operating on the exit gases from a converter in which benzene vapors are oxidized with air in the presence of a vanadium-containing catalyst. Such solutions may vary in their maleic acid content and therefore are preferably brought to a convenient uniform concentration of maleic acid, such as 60–80%, by a flash evaporator or other suitable means not shown on the drawing. In the present case a solution having a maleic acid content of about 75% is used.

Although the process of the invention is essentially continuous in operation it is most clearly illustrated by the molar quantities of materials used per unit of time. A feed containing 100 moles of maleic acid and 276.2 moles of water, preheated to a temperature of 100° C. is introduced into the column 1 through line 15 and flows downwardly through the dehydration zone. The temperature at the top of this zone is 176° C.; the bottom temperature is fixed by the boiling point of maleic anhydride and is 202° C. During the same time 320 moles of cumene (B.P. 153° C.) are fed to the top of the column through reflux line 16.

Maleic anhydride from the base of the column is continuously withdrawn through pump 7 and line 8 and boiled in the heater 9. The resulting vapors pass upwardly through the dehydration zone and provide the heat necessary to dehydrate the maleic acid feed and convert into steam its water content, both free and combined. Maleic anhydride vapors rising into the separation zone also furnish the heat required for the solvent fractionation carried out in this zone. Approximately 875 moles of maleic anhydride vapor are needed for these purposes and therefore the pump 7 and the heater 9 are operated to introduce this quantity of vapor through the pipe 10 during the time unit. As product, 91 moles of maleic anhydride vapor are drawn off through line 11 and are condensed in the condenser 12.

In order to remove fumaric acid a side stream containing 20 moles of maleic anhydride and approximately 0.5–1 mole of fumaric acid is withdrawn through line 36 and passed into dissolving tank 35 along with 80 moles of cumene from the separator 25. The insoluble fumaric acid is removed in the centrifuge 40 and the remaining solution of 20 moles of maleic acid in 80 moles of cumene is passed through lines 41 and 43 into the dehydration zone of the column at a plate containing liquid of about the same composition and at a temperature of 138°–140° C.

The vapors discharged from the top of the column through line 17 at about 130° C. contain 400 moles of cumene, 376.2 moles of steam and approximately 8 moles of maleic anhydride. This mixture is substantially completely condensed in the condenser 18 and is then passed into the washer or extraction tank 20 where it is agitated to bring about hydration of the maleic anhydride. The resulting 8 moles of maleic acid dissolve in the water, which is separated from the cumene in separator 25 and returned to the circulating tank 32 at the base of the fume tower while the cumene is recycled to the column and to the dissolving tank 35 as shown on the drawing.

*Example 2*

The temperature conditions described in Example 1 are maintained in the dehydrating and fractionating column but the feed is a 20 mole percent slurry of maleic acid in cumene. No aqueous maleic acid solution is introduced into the column as in Example 1. The feed slurry is preheated to 138°–140° C. and is fed to a plate in the separation zone containing liquid of approximately the same composition; from this plate the maleic acid flows downwardly through the column without material change until it enters the dehydration zone. The cumene becomes vaporized and remains in the separation zone.

The maleic acid passes downwardly into the dehydration zone in countercurrent contact with rising vapors of maleic anhydride and is converted into maleic anhydride vapor and superheated steam. The resulting vapor mixture rises into the separation zone where it is fractionated in the presence of the superheated steam into a volatile solvent fraction containing little or no maleic anhydride and a bottom fraction of substantially solvent-free liquid maleic anhydride that flows downwardly through the dehydration zone and eventually collects as a pool in the base of the column.

A quantity of maleic anhydride vapor corresponding to the maleic acid feed is withdrawn as product through pipe 11, while the superheated steam and cumene vapor are removed through line 17 and condensed in the condenser 18. In this case the quantity of maleic anhydride needed as vapor is approximately 583 moles for each 100 moles of maleic acid in the feed, and therefore this quantity is vaporized in the heater 9. Fumaric acid is removed from a side stream of the maleic anhydride as in Example 1 and the resulting solution of maleic anhydride in cumene is reintroduced into the column along with the stream of maleic acid feed.

What I claim is:

1. A method of producing maleic anhydride which comprises feeding maleic acid into an intermediate level of a fractionating column and passing it downwardly through a dehydration zone therein in admixture with liquid maleic anhydride and in counter-current contact with a rising stream of maleic anhydride vapor and thereby heating the mixture to 190°–220° C. and rapidly forming superheated steam and maleic anhydride therefrom, passing downwardly through a separation zone in the column above said dehydration zone a feed of an organic water-immiscible maleic anhydride solvent having a boiling point lower than that of maleic anhydride but higher than that of water, passing upwardly from the dehydration zone into said separation zone both the superheated steam and sufficient maleic anhydride vapor to vaporize the feed of organic maleic anhydride solvent and fractionating the resulting mixture in said zone into an overhead fraction of said solvent and a bottom fraction of substantially solvent-free liquid maleic anhydride, returning said bottom fraction to the dehydration zone and mixing it with the maleic acid feed therein, withdrawing product maleic anhydride from the bottom of said dehydration zone, withdrawing and condensing vapors of said organic solvent from the top of the column and returning said solvent to the separation zone therein.

2. A method according to claim 1 in which the organic water-immiscible maleic anhydride solvent is an alkylbenzene boiling above 142° C. but not higher than about 175° C.

3. A method according to claim 2 in which the organic solvent is cumene.

4. A method of producing maleic anhydride which comprises preparing an aqueous maleic acid solution by contacting maleic anhydride-containing gases with water in an absorption step, introducing an aqueous maleic acid solution from said absorption step into an intermediate level of a fractionating column and passing it downwardly through a dehydration zone therein in admixture with liquid maleic anhydride and in countercurrent contact with a rising stream of maleic anhydride vapor and thereby heating the mixture to 190°–220° C. and rapidly forming superheated steam and maleic anhydride therefrom, passing downwardly through a separation zone in the column above said dehydration zone a feed of an organic water-immiscible maleic anhydride solvent having a boiling point lower than that of maleic anhydride but higher than that of water, passing both the superheated steam and sufficient maleic anhydride vapor upwardly from the dehydration zone into said separation zone to vaporize the feed of organic maleic anhydride solvent and fractionating the resulting mixture in said zone into an overhead fraction of said solvent and a bottom fraction of substantially solvent-free liquid maleic anhydride and returning said bottom fraction to the dehydration zone, withdrawing product maleic anhydride from the bottom of said dehydration zone, withdrawing and condensing a mixture of said superheated steam and vapors of said organic solvent from the top of the column, separating said mixture and returning the water therein to said absorption step, and returning the organic solvent therein to the separation zone in said column.

5. A method of producing maleic anhydride which comprises feeding maleic acid into a downwardly flowing organic solvent-free stream of liquid maleic anhydride in a dehydration zone, heating the resulting mixture to a temperature between about 190° C. and 220° C. by passing it downwardly through said zone in countercurrent contact with vapors of boiling maleic anhydride and thereby decomposing the maleic acid rapidly and completely into maleic anhydride and superheated steam, withdrawing product maleic anhydride from the lower part of said zone, passing maleic anhydride vapor and superheated steam upwardly from the top of said zone and mixing them with a descending stream of a liquid water-immiscible maleic anhydride solvent boiling between 142° C. and about 175° C., separating the resulting mixture by fractional distillation in the presence of said superheated steam into an overhead fraction of said solvent and a bottom fraction of substantially solvent-free liquid maleic anhydride, and returning said bottom fraction to the dehydration zone.

6. A method according to claim 5 in which a stream of liquid maleic anhydride from the dehydration zone is dissolved in an organic solvent and the solution is centrifuged to separate fumaric acid therefrom.

7. A method according to claim 5 in which the maleic anhydride solvent is cumene.

References Cited in the file of this patent

UNITED STATES PATENTS

| | | |
|---|---|---|
| 2,166,556 | Spence | July 18, 1939 |
| 2,302,888 | Porter | Nov. 24, 1942 |
| 2,340,490 | Porter | Feb. 1, 1944 |
| 2,670,355 | Barsky et al. | Feb. 23, 1954 |
| 2,696,489 | Adams et al. | Dec. 7, 1954 |
| 2,729,599 | Ohsol et al. | Jan. 3, 1956 |
| 2,770,630 | Miller | Nov. 13, 1956 |